United States Patent
Doettling

(10) Patent No.: US 8,665,328 B2
(45) Date of Patent: Mar. 4, 2014

(54) METHOD AND APPARATUS FOR DETERMINING AN OVERTRAVEL TIME OF A MACHINE

(75) Inventor: Dietmar Doettling, Leinfelden-Echterdingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 935 days.

(21) Appl. No.: 12/704,071

(22) Filed: Feb. 11, 2010

(65) Prior Publication Data

US 2010/0208067 A1    Aug. 19, 2010

(30) Foreign Application Priority Data

Feb. 13, 2009 (DE) .......................... 10 2009 010 460

(51) Int. Cl.
- *H04N 7/18* (2006.01)
- *G06F 17/00* (2006.01)
- *G05G 1/00* (2008.04)

(52) U.S. Cl.
USPC ................................ 348/143; 700/90; 74/469

(58) Field of Classification Search
USPC ................................ 348/143; 74/469; 700/90
See application file for complete search history.

(56) References Cited

U.S. PATENT DOCUMENTS

| | | | |
|---|---|---|---|
| 6,124,586 A * | 9/2000 | De Coi ........................ | 250/221 |
| 6,808,289 B2 * | 10/2004 | Reed ............................ | 362/198 |
| 7,286,895 B2 | 10/2007 | Krieg | |
| 7,310,108 B2 | 12/2007 | Moore | |
| 2003/0076224 A1 * | 4/2003 | Braune ........................ | 340/500 |
| 2008/0273758 A1 | 11/2008 | Fuchs et al. | |
| 2009/0015663 A1 | 1/2009 | Doettling et al. | |
| 2009/0072100 A1 * | 3/2009 | Zierer et al. .................. | 248/169 |

FOREIGN PATENT DOCUMENTS

| | | |
|---|---|---|
| DE | 200 06 578 U1 | 8/2000 |
| DE | 199 38 639 A1 | 2/2001 |
| DE | 10 2005 056 265 A1 | 5/2007 |
| DE | 10 2005 063 217 A1 | 5/2007 |
| DE | 10 2004 058 472 A1 | 6/2008 |
| DE | 10 2006 058 707 A1 | 6/2008 |
| EP | 0 902 402 A2 | 3/1999 |

OTHER PUBLICATIONS hhb GmbH—Stop Time Meter; "Nachlaufmessung und Geschwindigkeitsmessung an Maschinen"; 6 pages.
EN 954-1; Safety-related parts of control systems Part 1: General principles for design; Dec. 1996; 33 pages.
Zvei: Automation; Safety of machinery; Notes on the application of standards EN 62061 and EN ISO 13849-1; Jun. 2007; 19 pages.

* cited by examiner

*Primary Examiner* — Backhean Tiv
*Assistant Examiner* — Alan S Chou
(74) *Attorney, Agent, or Firm* — Harness, Dickey & Pierce, P.L.C.

(57) ABSTRACT

An apparatus for determining an overtravel time of a machine, which has a moveable machine part and an optoelectronic protection device, has a light source designed to produce a defined light spot. The protection device for the machine comprises a camera having an observation area in which at least one protection zone having a protection zone boundary is defined. The protection device produces a stop signal when an object enters the protection zone. The light spot simulates an object within the protection zone. The light source is supported by a support element designed to position the light source in the area of the protection zone boundary. An evaluation and control unit of the apparatus is designed to switch on the light source at a defined starting time, and to determine a time interval between the defined starting time and the reception of an "end" signal indicating that the machine part has come to rest.

15 Claims, 2 Drawing Sheets

METHOD AND APPARATUS FOR DETERMINING AN OVERTRAVEL TIME OF A MACHINE

CROSSREFERENCE TO RELATED APPLICATIONS

This application claims priority from German patent application DE 10 2009 010 460.7 filed on Feb. 13, 2009. The entire content of this prior application is incorporated herein by reference.

BACKGROUND OF THE INVENTION

The present invention relates to an apparatus and a method for determining an overtravel time of a machine having a moveable machine part and an optoelectronic, camera-based protection device designed to stop any movement of the machine part.

There are numerous machines and machine installations having moving machine parts whose movement is hazardous for personnel in the vicinity of the machine. Typical examples include presses, machine tools, robots or transport and conveyor installations. It is known to protect the hazardous working area of such machines by means of optoelectronic protection devices. A light barrier or a light grid is often arranged in front of the hazardous working area. When light beams of the light barrier or light grid are interrupted, a stop signal is produced, by means of which the dangerous movement is stopped, or the entire machine is even shut down. In addition to conventional light barriers and light grids, optoelectronic protection devices have been proposed for some years, where a "virtual" protection zone in front of the hazardous working area is achieved by suitable evaluation of camera images. (In this case, in the following text and for the purposes of the present invention, the term "protection zone" is used, for the sake of simplicity, covering both one-dimensional linear protection areas, two-dimensional surface protection areas and three-protection protection volumes). By way of example, EP 0 904 402 A1 discloses a safety camera by means of which the entry area of a lift door is monitored.

Regardless of the nature of the optoelectronic protection device, the protection zone must be arranged sufficiently far away from the moving machine part so that a person or some other object which enters the protection zone cannot reach the moving machine before the machine part has actually come to rest. Since mass inertia, signal processing times and other delay times prevent a moving machine part to be brought to rest at the very same time that a protection zone is entered, an overtravel time of the machine part after triggering of a stop command is an important safety-relevant parameter for successful safeguarding of the machine. The overtravel time may vary because of ageing or because of different loading or fitting of a machine. Reaction times of a machine control system may vary because of individual programming For this reason, it is necessary to reliably determine the actual overtravel time of a machine, that is to say the time difference between the generation of a stop signal and the hazardous movement coming completely to rest.

DE 290 06 578 U1 discloses a system which is intended to allow accurate measurement of an overtravel time of a machine with an optoelectronic protection device. In this case, the optoelectronic protection device is a light grid with a plurality of light beams, which is arranged in front of a press. When light beams are interrupted, the light grid produces a stop signal which is transmitted to a control unit of the press. A reflector is arranged on the moving machine part, which in this case is the press stamp, and this reflector is moved together with the press stamp. A (further) optoelectronic sensor device having a plurality of light-sensitive sensor elements is arranged opposite the reflector. The reflector is illuminated by a light beam. The position of the reflector can therefore be recorded by means of the sensor unit. The overtravel time of the press stamp is determined by means of a storage oscilloscope, which produces a curve representing the position of the reflector, plotted against time. The stop signal for stopping the press stamp can be produced in various ways using the reflector. It is proposed that the protection zone of the light grid be interrupted by means of a so-called engagement element, which can be operated by an evaluation and control unit via a magnet. Furthermore, the stop signal can be produced by a light barrier which emits a signal to the storage oscilloscope when the reflector is detected and initiates the process of stopping the press stamp. Finally, a switching relay of the machine control system, by means of which the press is switched off, can be monitored by means of a magnetic sensor, in order to start the measurement of the overtravel time.

A mechanical engagement element by means of which light beams of a light grid may be automatically interrupted in order to trigger an overtravel measurement of a machine part is described in a product leaflet issued by German company HHB GmbH, 82211 Herrsching, Germany. The engagement element, which is referred to as an "auto hand" in the leaflet, can also be used to automatically operate emergency-off pushbuttons or foot-operated switches.

DE 10 2006 058 707 A1 discloses an apparatus and a method for determining an overtravel time and an overtravel distance of a machine, wherein the start of the measurement is initiated by operating an emergency-stop device.

DE 10 2004 058 472 A1 discloses an optoelectronic protection device for a press or a similar machine, wherein at least two optical barriers run in front of the moving press stamp at different distances in front of the moving press stamp. The first optical barrier triggers a stop signal as soon as it is interrupted. The second optical barrier, which is arranged closer to the moving press stamp, can be used to check if the overtravel distance of the moving press stamp is less than the relative distance between the two optical barriers in the movement direction.

SUMMARY OF THE INVENTION

In principle, the known methods and apparatuses can also be used for determining the overtravel time of a machine having a camera-based protection device. However, there is a desire to simplify the known methods and apparatuses. Against this background, therefore, it is an object of the present invention to provide a method and an apparatus designed to easily and exactly determine the overtravel time of a machine comprising a camera-based protection device.

According to a first aspect of the invention, there is provided an apparatus for determining an overtravel time of a machine having a moveable machine part and an optoelectronic protection device designed to stop movement of the machine part, wherein the protection device comprises a camera having an observation area in which at least one protection zone with a protection zone boundary is defined, and wherein the protection device produces a stop signal when an object enters the protection zone, the apparatus comprising a light source designed to produce a defined light spot for simulating an object within the protection zone, comprising a support element supporting the light source, with the support element being designed to position the light source in the area of the protection zone boundary, and comprising an evaluation and control unit which has a first signal input for receiving "end "signal indicating that the machine part has come to rest, wherein the evaluation and control unit is designed to switch on the light source at a defined starting time, and to determine a time interval between the defined starting time and a reception of stop said end signal.

According to a further aspect of the invention, there is provided a method for determining an overtravel time of a machine having a moveable machine part and an optoelectronic protection device designed to stop any movement of the machine part, wherein the protection device comprises a camera having an observation area in which at least one protection zone with a protection zone boundary is defined, and wherein the protection device produces a stop signal when an object enters the protection zone, the method comprising the following steps: providing at least one light source which can be selectively switched on and off, moving the machine part, generating a light spot within the protection zone by switching on the light source at a defined starting time, the light spot being designed to simulate an object, detecting a stop time, at which the machine part comes to rest, and determining a time interval between the starting time and the stop time.

The novel apparatus and the novel method are based on the idea of using a light source to simulate an object whose entry into the protection zone of a camera-based protection device produces a stop signal. To do this, it is sufficient to produce a light spot within the protection zone, which is sufficiently bright and large to be identified by the camera. Generally, it is sufficient for the light spot to identifiably vary the intensity value of a small number of pixels in the camera. In preferred exemplary embodiments, the light spot is sufficiently large that it corresponds approximately to the minimum spatial detection threshold of the camera. For example, if the camera triggers a stop signal whenever at least three pixels within the protection zone produce a different image value, the light spot is preferably chosen to be sufficiently large that it changes the at least three required pixels but not significantly more pixels. For example, in a situation such as this, the light spot is chosen to be sufficiently large that, for example, it changes four to ten pixels.

The method and the apparatus use the optical characteristics of the protection device in order to produce a trigger signal for measurement of the overtravel time. On the one hand, this makes it possible to very realistically determine the overtravel time, since the overtravel time is actually important for an emergency stop that is triggered by said protection device. On the other hand, the apparatus can be made very simple and largely independent of the actual characteristics of the machine The method can therefore be used very easily and universally for a large number of different machines.

Furthermore, the novel method and the novel apparatus make it possible to exactly determine the starting time for the measurement of the overtravel time, since a light source can be switched on with virtually no significant time delay. In other words, the electrical signal by means of which the light source is switched on very precisely represents the actual starting time for determining the overtravel time.

Furthermore, the novel apparatus can be designed to be very compact, cost-effective and have little wear. The abovementioned object is therefore achieved completely.

In a preferred refinement of the method, the light spot is produced precisely at the protection zone boundary. More preferably, a live image of the observation area of the camera, over which the protection zone boundary is superimposed, is used for positioning the light source. The support element for the apparatus is accordingly designed to position the light source precisely at the protection zone boundary, and it is preferable for the apparatus to have a display in order to display a live image of the observation area, with the protection zone boundary superimposed. In particularly preferred refinements, the light source is positioned such that it actually projects into the protection zone, while the support element is arranged outside the protection zone. It is thus possible in a simple manner to prepare an initially invisible infringement of the protection zone boundary, which the camera-based protection apparatus does not identify until the light source is switched on, and the light spot is therefore visible. However, in principle, it is also feasible to position the light source outside the protection zone, and to produce only the light spot at or beyond the protection zone boundary.

The refinement has the advantage that an infringement of the protection zone boundary forms the starting time for determining the overtravel time, resulting in the operation of the protection device being simulated very realistically. Furthermore, this refinement allows highly universal and flexible use of the novel apparatus, regardless of the actual environment of the machine.

In a further refinement, the light source is a point light source, in particular a light-emitting diode (LED).

The smaller the light source is, the further it can be moved to or into the protection zone without itself being identified as a protection zone infringement when in the switched-off state. In other words, a point light source is advantageous for positioning the light source within the protection zone or precisely at the protection zone boundary. A point light source therefore allows the overtravel time to be determined even more easily and exactly.

In a further refinement, the light source is arranged such that it is largely free-standing on the support element.

In this refinement, the light source projects "like an arrow" from the support element. It is particularly advantageous for the light source to be arranged on the support element without any socket or the like and to be attached to the support element only via rigid contact pins. It is particularly advantageous for the light source to be a wired LED or an LED using SMD (Surface Mounted Device) technology, which is attached to the support element only via rigid electrical contact tracks or connecting lines.

This refinement advantageously contributes to the capability to position the light source very close to the protection zone boundary or even beyond the protection zone boundary, and therefore within the protection zone. These refinements are therefore advantageous to allow the overtravel time to be determined as easily and exactly as possible, and largely universally, on different types of machines.

In a further refinement, the light source has a substantially transparent housing body.

This refinement again advantageously contributes to the light source being positioned very close to or even in the protection zone before the process of determining the overtravel time is started. In consequence, this refinement also allows the over-travel time to be determined very easily, exactly and universally.

In a further refinement, the support element has a telescopic stand.

This refinement increases the flexibility of the novel apparatus, since the light source can be easily positioned at different heights, regardless of the area surrounding the moving machine part.

In a further refinement, the support element has an adjustable head part on which the light source is arranged. In one particularly preferred exemplary embodiment, the head part is an arm or a plate which can rotate and/or pivot and to which the light source is attached.

This refinement allows the light source to be positioned particularly easily and flexibly at or in the area of the protection zone boundary which, for the reasons explained above, is advantageous for flexible and exact determination of the overtravel time.

In a further refinement, the evaluation and control unit has a second signal input for receiving an external trigger signal for switching on the light source.

Alternatively or in addition to this, the evaluation and control unit may have an internal signal generator for producing a trigger signal in order to switch on the light source. In both cases, the trigger signal for switching on the light source represents the defined starting time from which the measurement interval for determining the overtravel time starts. The measurement interval is ended by the stop signal at the first signal input of the evaluation and control unit. In preferred exemplary embodiments, both the trigger signal for switching on the light source and the stop signal for terminating the measurement interval originate from a machine control system. This preferred exemplary embodiment has the advantage that the overtravel time can be determined as a function of the actual positions of the moving machine part and, furthermore, automatically or at least in an automated form. The overtravel time determined in this way is a vey reliable and representative parameter for the respective machine. The supply of an external trigger signal for switching on the light source makes it possible to determine the over-travel time as a function of an exactly defined position or speed of the moving machine part. For example, it is advantageous to start the measurement interval at a machine position at which the moving machine part is at its maximum working speed and/or closest to the protection zone boundary. This refinement allows the overtravel time to be determined particularly conveniently and exactly.

In a further refinement, the apparatus has a pushbutton for manually switching on the light source. In a corresponding manner, in one refinement of the method, the light source is switched on manually.

These refinements allow the overtravel time to be determined very easily and flexibly, particularly when no suitable trigger signal is available from a machine control system. Furthermore, this refinement has the advantage that the apparatus can easily be used as a test instrument for checking the stop functionality of the optoelectronic protection device.

It goes without saying that the features mentioned above and those which are still to be explained in the following text can be used not only in the respectively stated combination but also in other combinations or on their own, without departing from the scope of the present invention.

BRIEF DESCRIPTION OF THE DRAWINGS

Exemplary embodiments of the invention will be explained in more detail in the following description, and are illustrated in the drawing, in which.

DESCRIPTION OF PREFERRED EMBODIMENTS

Figure 1:
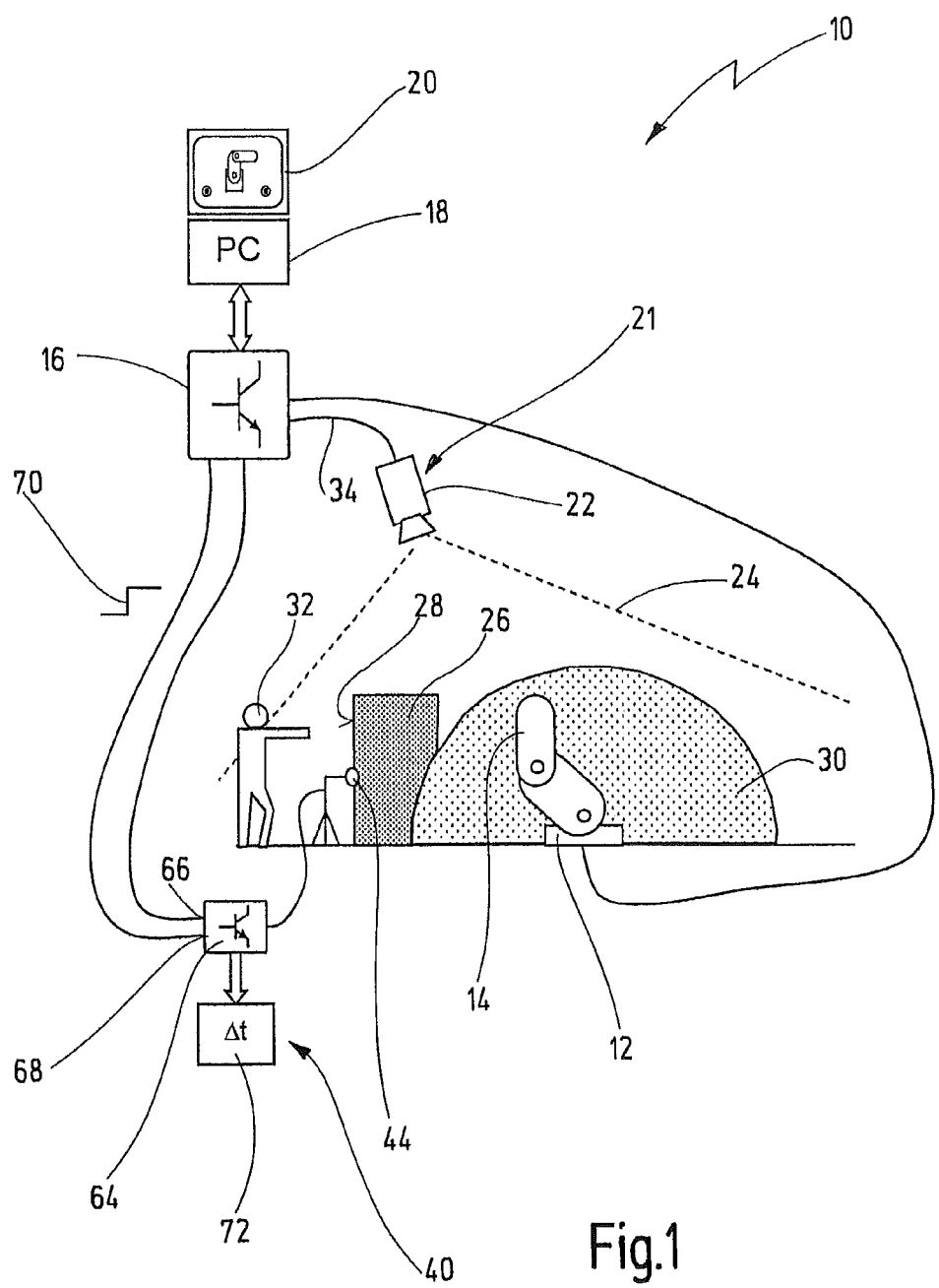
FIG. 1 shows a simplified illustration of an arrangement having a machine with a moving machine part, an optoelectronic protection device including a camera, and an apparatus for determining the overtravel time of the machine.

FIG. 1 shows an installation including an exemplary embodiment of the novel apparatus, the installation being annotated in its entirety by reference number 10. The installation 10 in this case comprises a robot 12 having a moveable robot arm 14. By way of example, the robot 12 may be an assembly robot, as is used for the production of motor vehicles, motor vehicle parts or other industrially produced objects. Reference number 16 denotes an installation control system, typically in the form of a programmable logic controller (PLC). The robot 12 is connected to and controlled by the installation control system 16.

Reference number 18 denotes a PC with a monitor 20. In this exemplary embodiment, the PC 18 is used to configure a camera-based, optoelectronic protection device 21 for safeguarding the robot 12. The protection device 21 includes a camera 22 having an observation area 24 in which a protection zone 26 with a protection zone boundary 28 is defined. Camera 22 is designed to record images of the observation area 24. The robot 12 and the protection zone 26 are located within the observation area 24. The monitor is able to display a live image from the camera 22, on which the defined protection zone 26 and/or the protection zone boundary 28 are/is superimposed.

The camera 22 is connected to a safety control system (not illustrated separately here), in which the images of the observation area are evaluated. In one preferred exemplary embodiment, the camera 22 not only produces two-dimensional image data but also range information relating to individual objects and contours within the observation area 24. An exemplary embodiment of such a camera is disclosed, for example, by DE 10 2005 063 217 A1 or DE 10 2005 056 265 A1, which are incorporated here by reference. The novel apparatus and the novel method, however, are not restricted to camera-based protection devices which produce and process range information. They can equally be used with camera-based protection devices which produce only a two-dimensional image of an observation area. One example of a camera-based protection device of this kind is disclosed by DE 199 38 639 A1.

In the preferred exemplary embodiment, the camera-based protection device 21 makes it possible to define substantially any desired protection zones 26 within the observation area 24. One preferred example for setting up such protection zones for a camera-based protection device which produces range information is disclosed in DE 10 2005 063 217 A1 already mentioned above. In the exemplary embodiment described there, the protection zone 26 together with the protection zone boundary 28 is defined such that it forms a virtual fence in front of the working area 30 of the robot 12. As soon as an object, such as person 32, breaks through the protection zone boundary 28, and thus approaches the working area 30, this is identified by means of the camera-based protection device 21. Typically, in a case such as this, the protection device 21 produces a stop signal 34 which is transmitted to the installation control system 16 and/or to contactors, which are not illustrated here, in order to stop the robot 12, and/or to switch it off completely. The appropriate definition of the protection zone boundaries 28, the reliable identification of every protection zone infringement and timely stopping or shutting down of robot 12 are safety-relevant processes which must be carried out in accordance with the relevant safety standards in order to rule out as reliably as possible any hazard to the person 32 as a result of a malfunction. In the preferred exemplary embodiments, the optoelectronic protection device is therefore produced in accordance with Standards EN 954-1, EN ISO 13949-1 and/or EN IEC 62061, and it therefore complies at least with the requirements of Category 3 according to EN 954-1 or comparable requirements, such as SIL 2 according to EN IEC 62061. In principle, the novel apparatus and the novel method, however, may also be used for other optoelectronic protection devices including those for security applications.

Reference number 40 denotes an exemplary embodiment of the novel apparatus. The apparatus 40 has a light source 52 (FIG. 2) by means of which a light spot 44 can selectively be produced. In the preferred exemplary embodiments, the light source 42 is positioned in the area of the protection zone boundary 28, as a result of which the light spot 44 is produced precisely at or on the protection zone boundary 28. The light spot 44 can simulate an object which has infringed the protection zone boundary 28 by entering the protection zone 26. This virtual object is recorded by camera 22 and is detected by the protection device 21 as an object entering the zone. In consequence, the protection device 21 produces the stop signal 34 when the light source 42 is switched on, and this is used in the exemplary embodiments of the novel method in order to determine the overtravel time of the robot 12 until it comes to rest.

Figure 2:
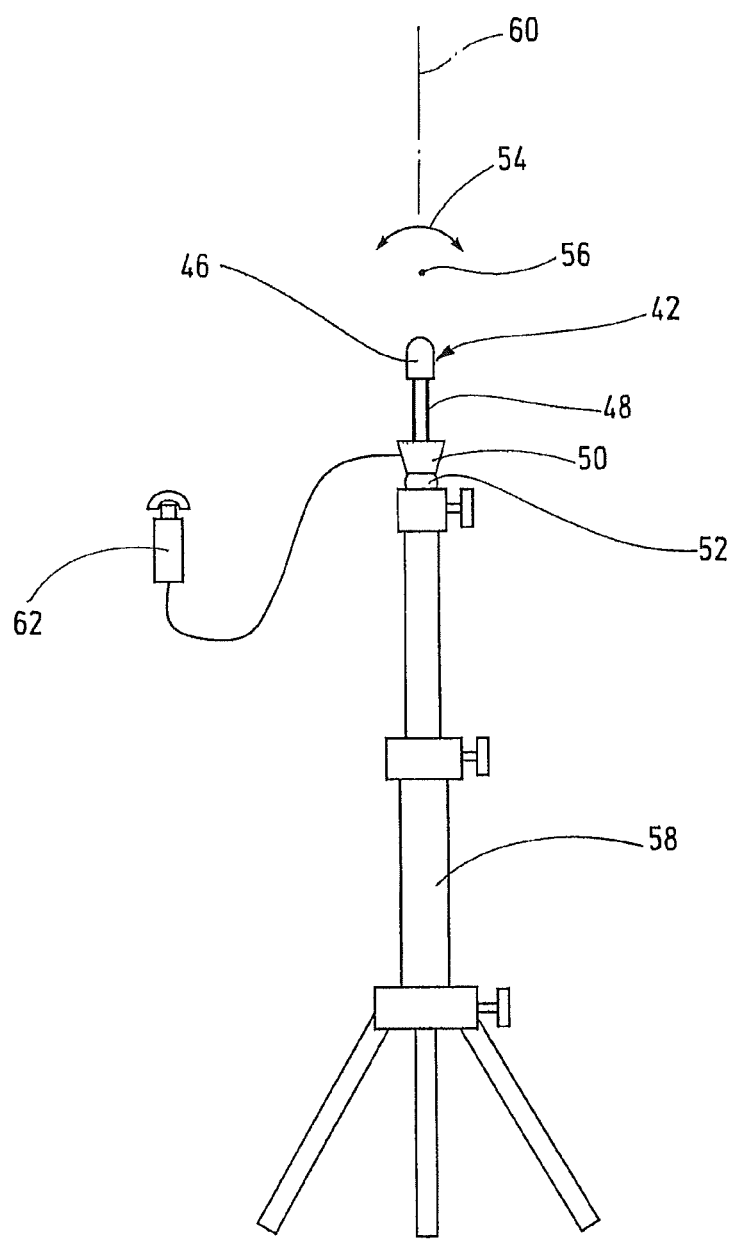
FIG. 2 shows an exemplary embodiment of the novel apparatus.

The rest of the description also refers to FIG. 2, in which the same reference symbols denote the same elements as before.

In the exemplary embodiment illustrated here, light source 42 is a wired LED with a transparent housing body 46. If the distance between light source 42 and camera 22 is sufficiently great so that camera 22 cannot identify the switched-off light source 42, the housing body 46 may also be coloured. It may also be advantageous for the housing body to have a colour which substantially corresponds to the prevailing background colour. In other preferred exemplary embodiments, an LED using SMD technology may be used instead of a wired LED and is held, as far as possible without a socket, solely by means of two rigid connecting wires. In the illustrated exemplary embodiment, the connecting wires of the light source 42 are an integral component of the wired LED.

In the exemplary embodiment illustrated here, the LED 42 is attached to a head part 50 by the connecting rods 48 without any socket or the like. In this case, the head part 40 is seated on a ball joint 52 and can accordingly pivot about two mutually perpendicular horizontal axes (only one horizontal axis is indicated, by the reference number 56, in FIG. 2). The head part 50 is arranged via the ball joint 52 on a telescopic stand 58 in the form of a support. In consequence, the height of the light source 42 can be adjusted parallel to the longitudinal axis 60 of the stand 58, and it can also be rotated about the longitudinal axis 60. In another exemplary embodiment, which is illustrated only schematically in FIG. 1, the light source 42 is arranged on a pivoting arm instead of the plate 50.

In FIG. 2, reference number 62 denotes a manual pushbutton which can be used to manually switch on and off light source 42. In preferred exemplary embodiments, the trigger signal for switching on the light source 42 is, however, generated by installation control system 16 or by some other suitable external signal source.

For this reason, the apparatus 40 has an evaluation and control unit 64 which is connected to the light source 42, instead of or in addition to pushbutton 62. In the preferred exemplary embodiments, the evaluation and control unit 64 has at least two signal inputs 66, 68. Signal input 66 is used to supply an "end" signal which represents the end of the measurement interval for determining the overtravel time Δt. The second signal input 68 is used in the preferred exemplary embodiments for supplying the external trigger signal. In the exemplary embodiment illustrated in FIG. 1, the installation control system 16 generates both the stop signal for the signal input 66 and the trigger signal for the signal input 68. In the preferred exemplary embodiments, both signals each have a signal flank 70 which can easily be detected by a logic circuit and/or an oscilloscope, in order to determine the length Δt of the measurement interval. In one preferred exemplary embodiment, the trigger signal is a pulse sequence with a plurality of signal flanks 70. The overtravel time is measured a number of times, for example ten times, and a mean overtravel time is determined as a mean value of the individual measurements, in order to compensate for scatters in the signal delay times.

In preferred exemplary embodiments, the evaluation and control unit 64 has a display 72 and is designed to automatically determine the measurement interval between the two signal flanks 70 at the signal inputs 66, 68, and to display this on the display 72. Furthermore, the evaluation and control unit 64 in the preferred exemplary embodiments has an internal signal generator (not illustrated here), in order to produce the trigger signal for switching on light source 42 independently of an external trigger signal.

The evaluation and control unit 64 may have a switch or some other actuating element (not illustrated here) in order to selectively choose between external and internal production of the trigger signal in order to switch on the light source.

What is claimed is:

1. An apparatus for determining an overtravel time of a machine having a moveable machine part and an optoelectronic protection device designed to stop movement of the machine part, wherein the protection device comprises a camera having an observation area in which at least one protection zone with a protection zone boundary is defined, and wherein the protection device produces a stop signal when an object enters the protection zone, the apparatus comprising:
   a light source designed to produce a defined light spot for simulating an object within the protection zone,
   a support element supporting the light source, with the support element being designed to position the light source in the area of the protection zone boundary, and
   an evaluation and control unit having a first signal input for receiving an end signal indicating that the machine part has come to rest,
   wherein the evaluation and control unit is designed to switch on the light source at a defined starting time, and to determine a time interval between the defined starting time and reception of said end signal.

2. The apparatus of claim 1, wherein the light source is a point light source.

3. The apparatus of claim 1, wherein the light source is an LED.

4. The apparatus of claim 1, wherein the light source is arranged such that it is largely free-standing on the support element.

5. The apparatus of claim 1, wherein the light source comprises a substantially transparent housing body.

6. The apparatus of claim 1, wherein the support element has a telescopic stand.

7. The apparatus of claim 1, wherein the support element has an adjustable head part on which the light source is arranged.

8. The apparatus of claim 1, wherein the evaluation and control unit has a second signal input for receiving an external trigger signal for switching on the light source.

9. The apparatus of claim 1, wherein the evaluation and control unit has a pushbutton for manually switching on the light source.

10. The apparatus of claim 1, wherein the protection device produces the stop signal upon detection of the light spot generated by the light source after switch on of the light source.

11. The apparatus of claim 10, wherein said protection device and said evaluation and control unit are connected to a controller adapted to control the moveable machine part, and further wherein said end signal is produced by said controller and supplied to said first signal input of said evaluation and control unit.

12. A method for determining an overtravel time of a machine having a moving machine part and an optoelectronic protection device designed to stop movement of the machine part, wherein the protection device comprises a camera having an observation area in which at least one protection zone with a protection zone boundary is defined, and wherein the protection device produces a stop signal when an object enters the protection zone, the method comprising the following steps:

providing at least one light source which can be selectively switched on and off, moving the machine part, generating a light spot within the protection zone by switching on the light source at a defined starting time, the light spot being designed to simulate an object within the protection zone, detecting a stop time, at which the machine part comes to rest, and determining a time interval between the starting time and the stop time.

13. The method of claim 12, wherein the light spot is generated precisely at the zone boundary.

14. The method of claim 12, wherein the machine and the light source are controlled by a controller, and further wherein the defined starting time is determined by the production of a turn-on signal by the controller to switch on the light source.

15. The method of claim 12, wherein the protection device produces the stop signal upon detection of the light spot generated by the light source after switching on of the light source.

* * * * *